US012645289B2

(12) United States Patent
Moore

(10) Patent No.: US 12,645,289 B2
(45) Date of Patent: Jun. 2, 2026

(54) LARGE SPACE TRACKING USING A WEARABLE OPTICS DEVICE

(71) Applicant: BAE SYSTEMS plc, London (GB)

(72) Inventor: David Michael Moore, Rochester (GB)

(73) Assignee: BAE SYSTEMS PLC, London (GB)

( * ) Notice: Subject to any disclaimer, the term of this patent is extended or adjusted under 35 U.S.C. 154(b) by 453 days.

(21) Appl. No.: 18/246,745

(22) PCT Filed: Sep. 22, 2021

(86) PCT No.: PCT/GB2021/052457
§ 371 (c)(1),
(2) Date: Mar. 27, 2023

(87) PCT Pub. No.: WO2022/064190
PCT Pub. Date: Mar. 31, 2022

(65) Prior Publication Data
US 2023/0367390 A1 Nov. 16, 2023

(30) Foreign Application Priority Data

Sep. 28, 2020 (EP) ..................................... 20275152
Sep. 28, 2020 (GB) ..................................... 2015293

(51) Int. Cl.
*G06F 3/01* (2006.01)
*G06T 7/73* (2017.01)
(Continued)

(52) U.S. Cl.
CPC ............... *G06F 3/012* (2013.01); *G06T 7/74* (2017.01); *G06V 10/225* (2022.01);
(Continued)

(58) Field of Classification Search
CPC . G06F 3/012; G06T 7/74; G06T 2207/30204; G06V 10/225; G06V 10/245;
(Continued)

(56) References Cited

U.S. PATENT DOCUMENTS 7,000,469 B2 * 2/2006 Foxlin .................. G01C 21/188
73/488
9,891,705 B1 2/2018 Lahr et al.
(Continued)

FOREIGN PATENT DOCUMENTS

EP 1139270 A2 10/2001
JP 2008070267 A 3/2008
(Continued)

OTHER PUBLICATIONS

He, Changyu, et al. "An inertial and optical sensor fusion approach for six degree-of-freedom pose estimation." Sensors 15.7 (2015) : 16448-16465. (Year: 2015).*
(Continued)

*Primary Examiner* — Henok Shiferaw
*Assistant Examiner* — Dion J Satcher
(74) *Attorney, Agent, or Firm* — Arcane Law PLLC

(57) ABSTRACT

Systems and methods for determining a head pose of a user are described. Images captured by a head-mounted camera worn by the user are received, the images comprising captured markers, wherein each captured marker is one of a plurality of markers on a surface that are in the FOV of the head-mounted camera. Stored markers having a predetermined orientation and corresponding to each captured marker are identified from a database, the stored markers comprising coordinates for its corresponding surface marker. An orientation of the captured marker relative to its corresponding stored marker is calculated and the stored marker is obtained. Based on the stored marker and the orientation, an absolute pose of each marker is determined. Based on the absolute pose of each marker, the head pose of the user relative to the surface is calculated.

19 Claims, 8 Drawing Sheets

(51) Int. Cl.

| | |
|---|---|
| *G06V 10/22* | (2022.01) |
| *G06V 10/24* | (2022.01) |
| *G06V 10/75* | (2022.01) |

(52) U.S. Cl.

CPC .......... *G06V 10/245* (2022.01); *G06V 10/751* (2022.01); *G06T 2207/30204* (2013.01)

(58) Field of Classification Search

CPC ... G06V 10/751; G06V 20/20; G02B 27/0093
USPC ......................................................... 382/103
See application file for complete search history.

(56) References Cited

U.S. PATENT DOCUMENTS

| | | | | |
|---|---|---|---|---|
| 10,929,670 | B1 * | 2/2021 | Troy ....................... | G06V 20/20 |
| 2005/0078178 | A1 * | 4/2005 | Brown ................... | H04N 7/181 |
| | | | | 348/139 |
| 2012/0269387 | A1 * | 10/2012 | Becker .................... | G06T 7/254 |
| | | | | 382/103 |
| 2013/0249784 | A1 * | 9/2013 | Gustafson ............ | G01R 33/072 |
| | | | | 345/156 |
| 2016/0371559 | A1 * | 12/2016 | Yang .................... | G06V 10/245 |
| 2017/0132806 | A1 * | 5/2017 | Balachandreswaran ..................... | |
| | | | | G06T 7/55 |
| 2017/0178359 | A1 * | 6/2017 | Spiessl ....................... | G06T 7/73 |
| 2018/0046874 | A1 * | 2/2018 | Guo ..................... | G06V 10/507 |
| 2019/0096068 | A1 * | 3/2019 | Fontanel ................... | G06T 7/20 |
| 2019/0156086 | A1 | 5/2019 | Plummer et al. | |
| 2021/0025717 | A1 * | 1/2021 | Mendez ............... | G01C 21/206 |
| 2021/0248824 | A1 * | 8/2021 | Sahu ..................... | G06T 19/006 |

FOREIGN PATENT DOCUMENTS

| | | |
|---|---|---|
| JP | 2010092436 A | 4/2010 |
| JP | 2017010533 A | 1/2017 |
| WO | 2015123774 A1 | 8/2015 |
| WO | 2022064190 A1 | 3/2022 |

OTHER PUBLICATIONS

International Search Report and Written Opinion received for PCT/GB2021/052457. Mailed: Dec. 6, 2021. 18 pages.

Extended European Search Report received for EP Application No. 20275152.5, dated Mar. 24, 2021. 9 pages.

GB Combined Search and Examination Report under Sections 17 and 18(3) received for GB Application No. 2015293.0, dated Mar. 10, 2021. 5 pages.

Gilson, et al., "Spatial calibration of an optical see-through head-mounted display," Journal of Neuroscience Methods, vol. 173, No. 1. Dec. 31, 2008. pp. 140-146.

Translation of First Office issued for JP Application No. 2023-519340, dated Apr. 16, 2024. 5 pages.

* cited by examiner

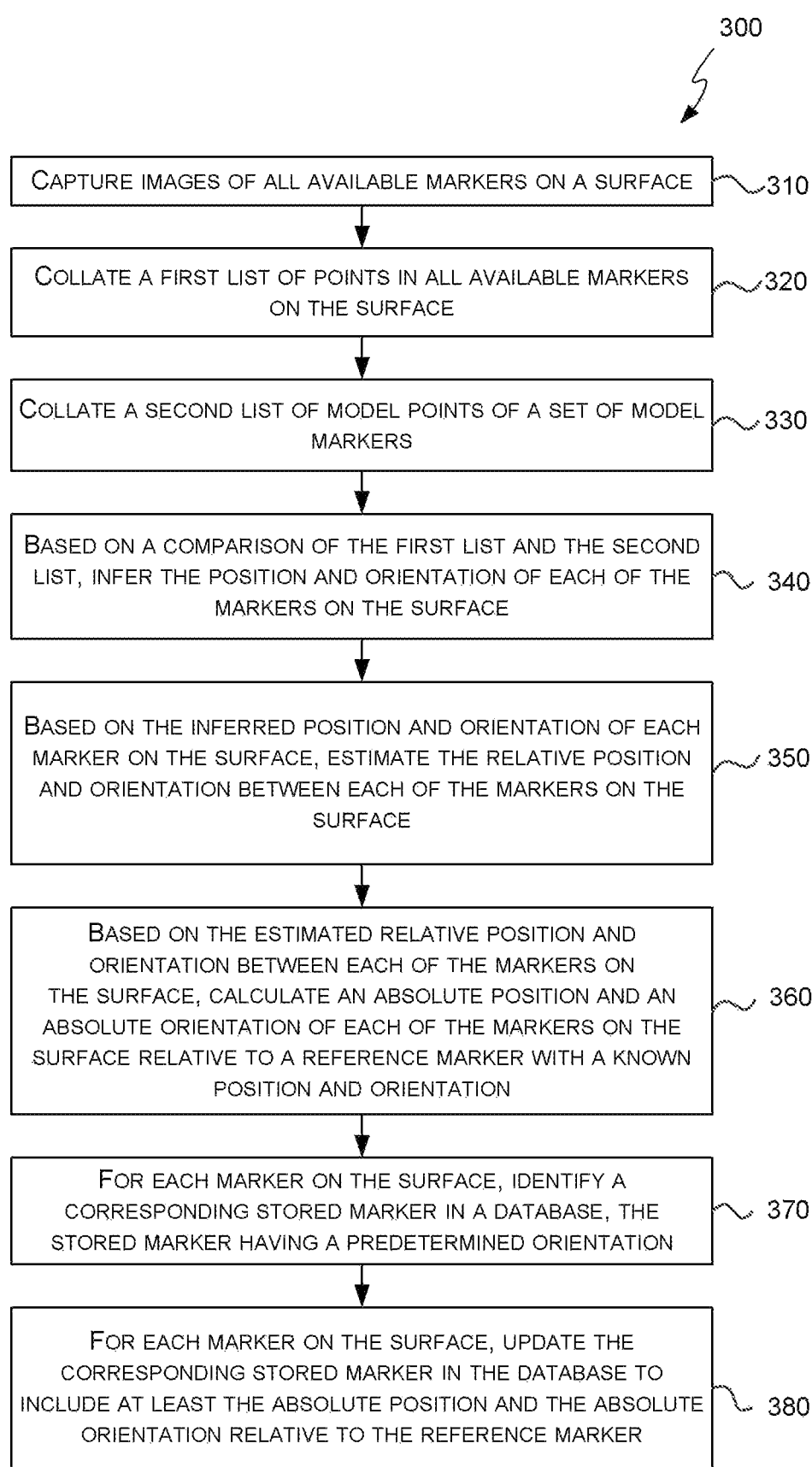

300

CAPTURE IMAGES OF ALL AVAILABLE MARKERS ON A SURFACE ~310

COLLATE A FIRST LIST OF POINTS IN ALL AVAILABLE MARKERS ON THE SURFACE ~320

COLLATE A SECOND LIST OF MODEL POINTS OF A SET OF MODEL MARKERS ~330

BASED ON A COMPARISON OF THE FIRST LIST AND THE SECOND LIST, INFER THE POSITION AND ORIENTATION OF EACH OF THE MARKERS ON THE SURFACE ~340

BASED ON THE INFERRED POSITION AND ORIENTATION OF EACH MARKER ON THE SURFACE, ESTIMATE THE RELATIVE POSITION AND ORIENTATION BETWEEN EACH OF THE MARKERS ON THE SURFACE ~350

BASED ON THE ESTIMATED RELATIVE POSITION AND ORIENTATION BETWEEN EACH OF THE MARKERS ON THE SURFACE, CALCULATE AN ABSOLUTE POSITION AND AN ABSOLUTE ORIENTATION OF EACH OF THE MARKERS ON THE SURFACE RELATIVE TO A REFERENCE MARKER WITH A KNOWN POSITION AND ORIENTATION ~360

FOR EACH MARKER ON THE SURFACE, IDENTIFY A CORRESPONDING STORED MARKER IN A DATABASE, THE STORED MARKER HAVING A PREDETERMINED ORIENTATION ~370

FOR EACH MARKER ON THE SURFACE, UPDATE THE CORRESPONDING STORED MARKER IN THE DATABASE TO INCLUDE AT LEAST THE ABSOLUTE POSITION AND THE ABSOLUTE ORIENTATION RELATIVE TO THE REFERENCE MARKER ~380

FIG. 3

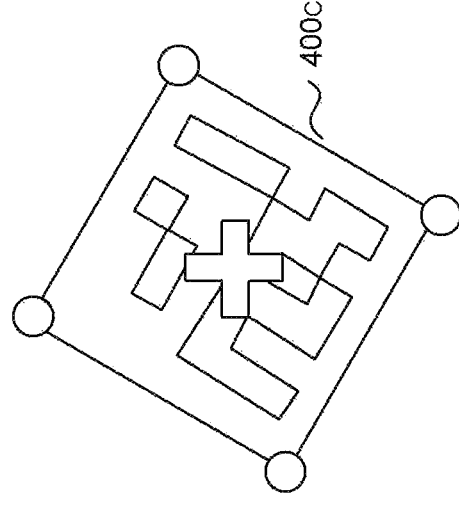
400A
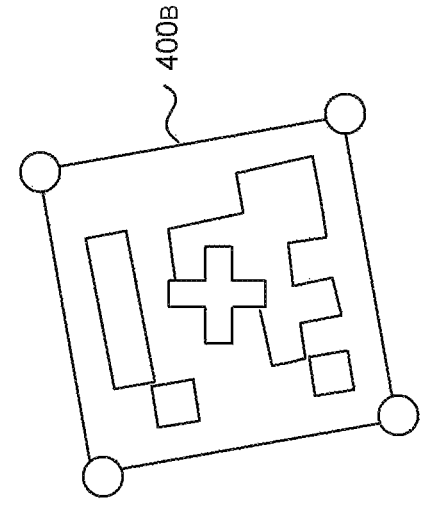
400B
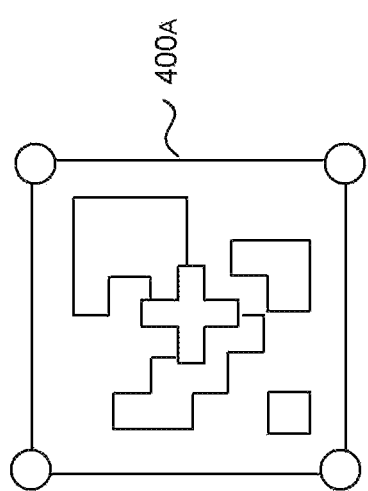
400C
FIG. 4

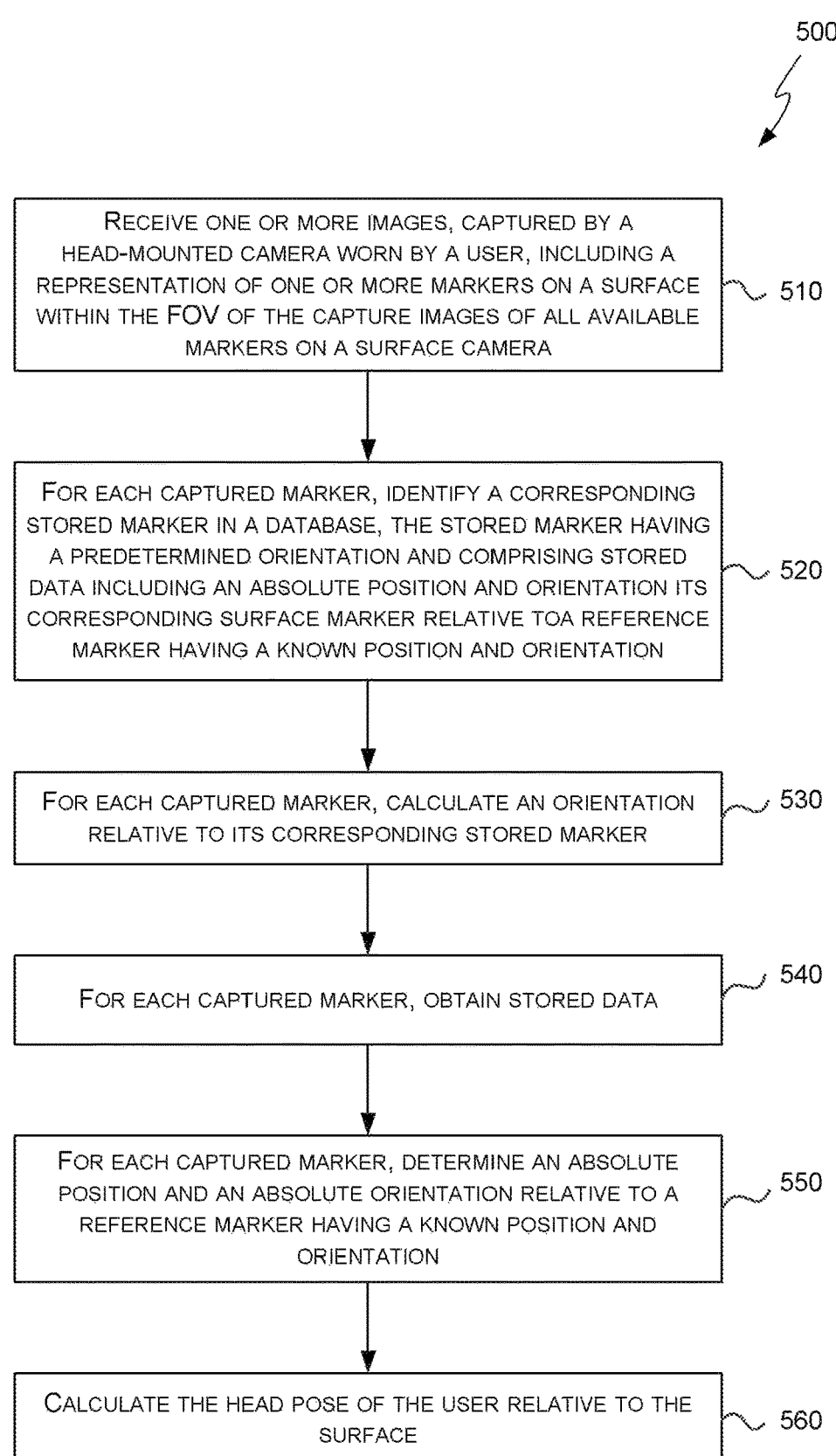

500

RECEIVE ONE OR MORE IMAGES, CAPTURED BY A HEAD-MOUNTED CAMERA WORN BY A USER, INCLUDING A REPRESENTATION OF ONE OR MORE MARKERS ON A SURFACE WITHIN THE FOV OF THE CAPTURE IMAGES OF ALL AVAILABLE MARKERS ON A SURFACE CAMERA — 510

FOR EACH CAPTURED MARKER, IDENTIFY A CORRESPONDING STORED MARKER IN A DATABASE, THE STORED MARKER HAVING A PREDETERMINED ORIENTATION AND COMPRISING STORED DATA INCLUDING AN ABSOLUTE POSITION AND ORIENTATION ITS CORRESPONDING SURFACE MARKER RELATIVE TOA REFERENCE MARKER HAVING A KNOWN POSITION AND ORIENTATION — 520

FOR EACH CAPTURED MARKER, CALCULATE AN ORIENTATION RELATIVE TO ITS CORRESPONDING STORED MARKER — 530

FOR EACH CAPTURED MARKER, OBTAIN STORED DATA — 540

FOR EACH CAPTURED MARKER, DETERMINE AN ABSOLUTE POSITION AND AN ABSOLUTE ORIENTATION RELATIVE TO A REFERENCE MARKER HAVING A KNOWN POSITION AND ORIENTATION — 550

CALCULATE THE HEAD POSE OF THE USER RELATIVE TO THE SURFACE — 560

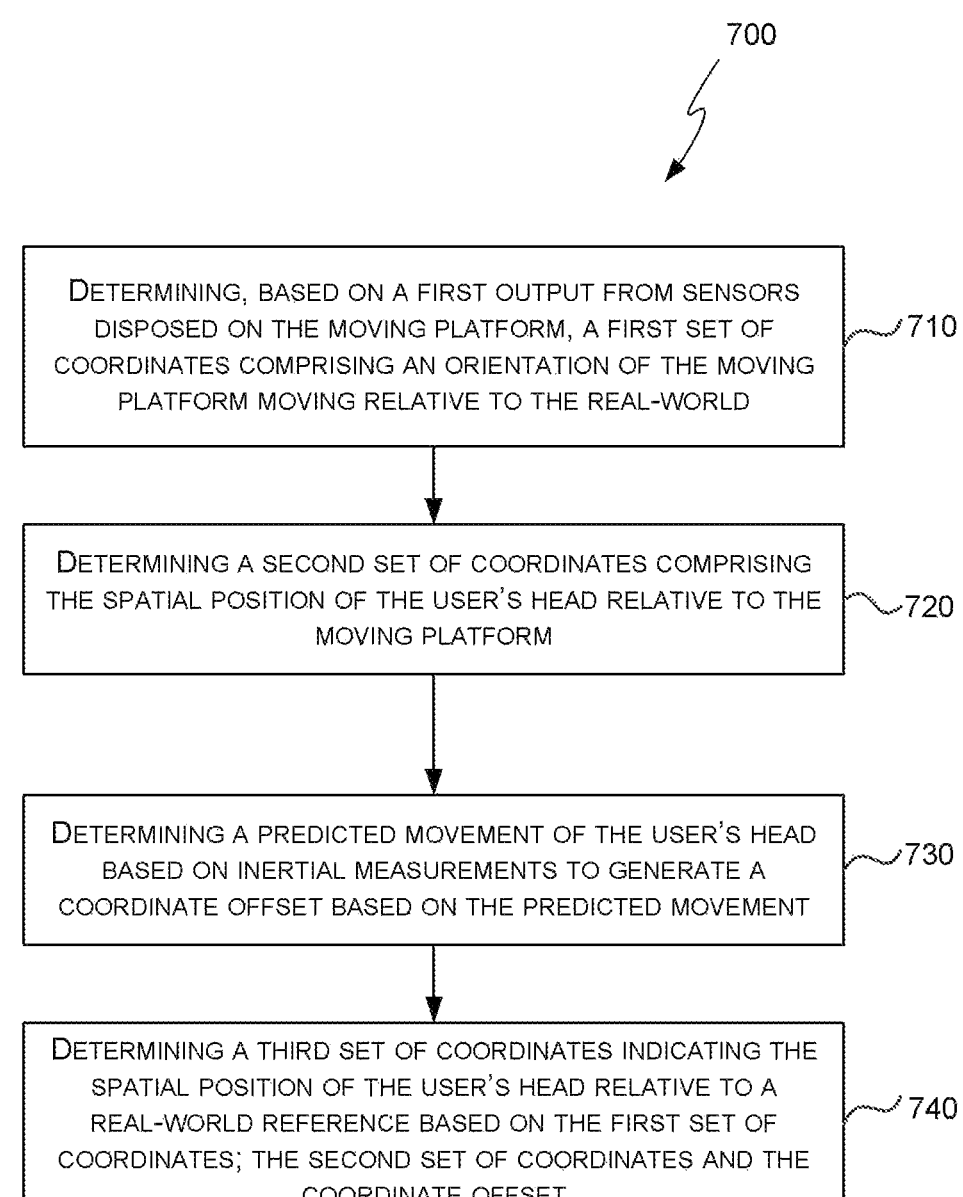

DETERMINING, BASED ON A FIRST OUTPUT FROM SENSORS DISPOSED ON THE MOVING PLATFORM, A FIRST SET OF COORDINATES COMPRISING AN ORIENTATION OF THE MOVING PLATFORM MOVING RELATIVE TO THE REAL-WORLD          710

DETERMINING A SECOND SET OF COORDINATES COMPRISING THE SPATIAL POSITION OF THE USER'S HEAD RELATIVE TO THE MOVING PLATFORM          720

DETERMINING A PREDICTED MOVEMENT OF THE USER'S HEAD BASED ON INERTIAL MEASUREMENTS TO GENERATE A COORDINATE OFFSET BASED ON THE PREDICTED MOVEMENT          730

DETERMINING A THIRD SET OF COORDINATES INDICATING THE SPATIAL POSITION OF THE USER'S HEAD RELATIVE TO A REAL-WORLD REFERENCE BASED ON THE FIRST SET OF COORDINATES; THE SECOND SET OF COORDINATES AND THE COORDINATE OFFSET          740

FIG. 7

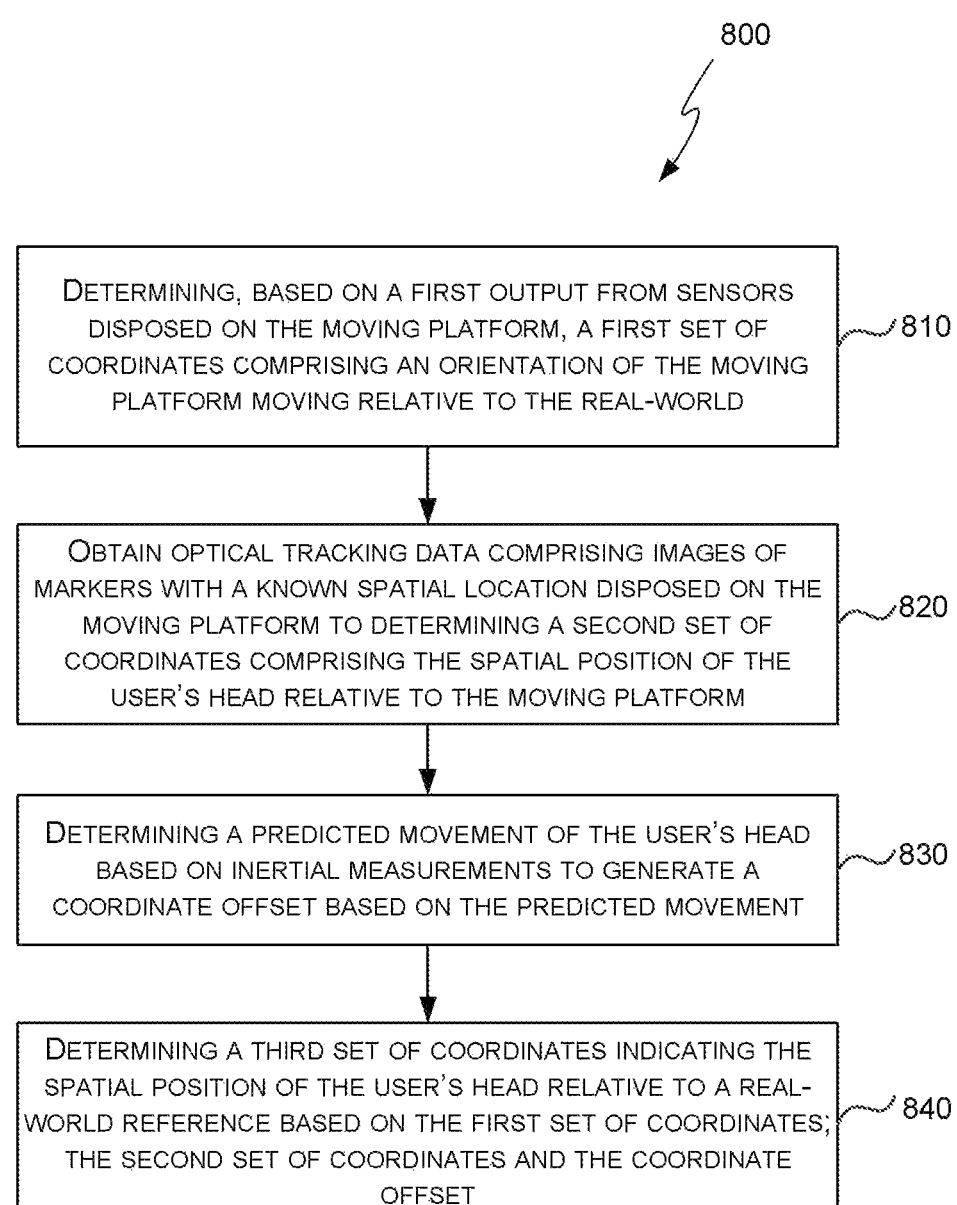

800

DETERMINING, BASED ON A FIRST OUTPUT FROM SENSORS DISPOSED ON THE MOVING PLATFORM, A FIRST SET OF COORDINATES COMPRISING AN ORIENTATION OF THE MOVING PLATFORM MOVING RELATIVE TO THE REAL-WORLD — 810

OBTAIN OPTICAL TRACKING DATA COMPRISING IMAGES OF MARKERS WITH A KNOWN SPATIAL LOCATION DISPOSED ON THE MOVING PLATFORM TO DETERMINING A SECOND SET OF COORDINATES COMPRISING THE SPATIAL POSITION OF THE USER'S HEAD RELATIVE TO THE MOVING PLATFORM — 820

DETERMINING A PREDICTED MOVEMENT OF THE USER'S HEAD BASED ON INERTIAL MEASUREMENTS TO GENERATE A COORDINATE OFFSET BASED ON THE PREDICTED MOVEMENT — 830

DETERMINING A THIRD SET OF COORDINATES INDICATING THE SPATIAL POSITION OF THE USER'S HEAD RELATIVE TO A REAL-WORLD REFERENCE BASED ON THE FIRST SET OF COORDINATES; THE SECOND SET OF COORDINATES AND THE COORDINATE OFFSET — 840

FIG. 8

LARGE SPACE TRACKING USING A WEARABLE OPTICS DEVICE

The present invention relates to large space tracking using a wearable optics device.

BACKGROUND

Wearable optical devices are common in many walks of life. These include automotive applications, aviation, military applications, engineering, medicine, gaming and any general application for viewing media and the like. Wearable optical devices are often referred to as head mounted displays or head worn displays; the expression 'HWD' is used herein to represent head mounted displays, head worn displays and any other wearable optical devices such as, for example, goggles, glasses and hand held devices with viewing capabilities. Most HWD include two eye pieces, one for each eye.

An example HWD 100 is illustrated in FIG. 1. HWDs, such as HWD 100, are wearable by a user by means of an appropriate support 102. The support includes one or more optical elements 104 which can be viewed by one or both eyes of the user. Although not shown in detail, the optical elements 104 include a substantially transparent display medium. The user is able to view the exterior environment through the optical elements 104. The user is also able to view images relayed to the eye of the user in use via the HWD.

In conventional systems, images are relayed to the eye of the user in use using lens trains or folded optical designs. Lens trains or folded optical designs are incorporated into the HWD 100. Traditionally, lens trains or folded optical designs are incorporated within the support 102 of the HWD 100.

HWDs are used for many applications as indicated above, however there is a continual problem encountered in their use. Conventional head-worn displays have a limited field of view. When a user is wearing a head-worn display on a surface, it is challenging to accurately provide information or features from the real-world space at the corresponding location within the field of view of the head-worn display. This is exacerbated by the latency of motion of the head. Further challenges arise when the surface is in motion moving surface due to the additional latency as a result of movement of the surface. There is a need to provide for an improved tracking solution to accurately determine the pose of the head of a user when wearing a head-worn display on a surface.

A further problem encountered in many uses of wearable optics devices is associated with the need to add symbology to the display. Symbology is the use of symbols to help a user wearing the device to provide additional information. For example, providing a symbol indicating the horizon to a pilot flying an aeroplane. If the head position of the user is not accurately identified, the horizon may be inaccurately located and could bring about catastrophic pilot errors.

Accordingly, one object of the present invention is to provide world-stabilised information, via the head-worn display, to a user.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the disclosed technology, there is provided a method for determining a head pose of a user. The method comprises receiving one or more images captured by a head-mounted camera worn by the user, the images comprising one or more captured markers, wherein each captured marker is one of a plurality of markers on a surface that are in the FOV of the head-mounted camera; identifying, from a database, for each of the captured markers in the one or more images, one of a plurality of stored markers, each stored marker having a predetermined orientation and a corresponding marker on the surface, wherein each stored marker comprises coordinates for its corresponding marker on the surface; calculating, for each of the captured markers in the one or more images, an orientation of the captured marker relative to its corresponding stored marker; obtaining from the database, for each captured marker in the one or more images, the corresponding stored marker; determining, based on the stored marker and the calculated orientation, an absolute pose of each captured marker in the one or more images; and calculating, based on the absolute pose of each captured marker, the head pose of the user relative to the surface.

In some example embodiments, each marker on the surface comprises a plurality of points having an associated set of coordinates.

In some example embodiments, each stored marker comprises a plurality of stored points, each stored point corresponding to one of the points of its corresponding marker on the surface.

In some example embodiments, the method comprises collecting data for storage in the database, the collecting data comprising capturing images of all markers on the surface using the head-mounted camera; comparing the plurality of points in each of the captured markers with a plurality of model points in a set of model markers, the set of model points having an associated set of theoretical coordinates; based on the comparison, inferring the position and orientation of each of the markers on the surface; based on the inferred position and orientation of each of the markers on the surface, estimating the relative position and orientation of each of the markers on the surface relative to the other markers on the surface; based on the estimated relative position and orientation of each of the markers on the surface, calculating an absolute position and an absolute orientation of the each of the markers on the surface relative to a reference marker, the reference marker having a known position and orientation on the surface; identifying, from the database, for each marker on the surface, the corresponding stored marker; and updating, for each marker on the surface, the corresponding stored marker to include the absolute position and the absolute orientation.

In some example embodiments, updating the corresponding stored marker for each marker on the surface comprises updating the corresponding stored marker to include at least one of the inferred position and orientation of its corresponding marker on the surface and the relative position and orientation of its corresponding marker on the surface relative to the other markers on the surface.

In some example embodiments, identifying one of the plurality of stored markers comprises comparing, for each captured marker, the plurality of points in the captured marker with the plurality of stored points in the stored markers in the database.

In some example embodiments, identifying, from the database, one of a plurality of stored markers comprises cross-referencing, for each captured marker, the captured marker with the stored markers in the database, wherein each captured marker has a predetermined pattern and its corresponding stored marker has the same pattern.

In some example embodiments, the markers on the surface are rectangular fiducials.

In some example embodiments, the plurality of points within the markers on the surface form the corners of the rectangular fiducials.

In some example embodiments, calculating, based on the absolute pose of each captured marker, comprises determining the head pose of the user relative to the surface in six degrees of freedom.

In some example embodiments, determining the absolute pose of each captured marker comprises, determining, for each captured marker, an absolute position and an absolute orientation of the captured marker relative to a reference marker having a known position and orientation on the surface.

In some example embodiments, the known position and orientation of the reference marker is representative of the origin of the head-mounted camera.

In some example embodiments, the head-mounted camera is mounted on or is integral to the head-worn display.

In some example embodiments, the head-mounted camera for capturing the one or more images is at least one of a stereo camera and a depth camera.

According to another aspect of the disclosed technology, there is provided a system comprising a head-worn display comprising at least one camera adapted to capture one or more images of a scene in which a plurality of markers are located; and a processor configured to execute instructions to: process the one or more images to identify a captured marker; identify, from a database, one of a plurality of stored markers, each stored marker having a predetermined orientation and a corresponding marker on the surface, wherein each stored marker comprises coordinates for its corresponding marker on the surface; calculate an orientation of the captured marker relative to its corresponding stored marker; obtain, from the database, the corresponding stored marker; determine, based on the corresponding stored marker and the calculated orientation, an absolute pose of the marker; and calculate, based on the absolute pose of each captured marker, the head pose of the user relative to the surface.

In some example embodiments, the head-worn display is configured to capture image of all markers on the surface and wherein the processor is configured to: compare a plurality of points in each of the captured markers with a plurality of model points in a set of model markers, wherein the each of plurality of points have an associated set of coordinates and wherein the each of the plurality of model points have an associated set of theoretical coordinates; based on the comparison, infer the position and orientation of each of the markers on the surface; based on the inferred position and orientation of each of the markers on the surface, estimate the relative position and orientation of each of the markers on the surface relative to the other markers on the surface; based on the estimated relative position and orientation of each of the markers on the surface, calculate an absolute position and an absolute orientation of the each of the markers on the surface relative to a reference marker, the reference marker having a known position and orientation on the surface; identify, from the database, for each marker on the surface, the corresponding stored marker; and update, for each marker on the surface, the corresponding stored marker to include the absolute position and the absolute orientation.

In some example embodiments, the processor is configured to update, for each marker on the surface, the corresponding stored marker to include at least one of the inferred position and orientation of its corresponding marker on the surface and the relative position and orientation of its corresponding marker on the surface relative to the other markers on the surface.

In some example embodiments, the processor is configured to compare the plurality of points in the captured marker with a plurality of stored points in the corresponding stored marker, each stored point corresponding to one of the points in corresponding captured marker.

In some example embodiments, the processor is configured to cross-reference the captured marker with the stored markers in the database wherein each captured marker has a predetermined pattern and its corresponding stored marker has the same pattern.

In some example embodiments, the processor is configured to determine the head pose of the user relative to the surface in six degrees of freedom.

In some example embodiments, the processor is configured to determine, for each captured marker, an absolute position and an absolute orientation relative to a reference marker having a known position and orientation on the surface.

In some example embodiments, the at least one camera is at least one of a stereo camera and a depth camera.

In some example embodiments, the head-worn display comprises at least one of a frame, side arms and supports for goggles or glasses, a helmet or visor, a headband, a neck or shoulder worn support, and a headset.

According to another aspect of the disclosed technology, there is provided a head-worn display for use in the system as claimed.

According to another aspect of the disclosed technology, there is provided markers for use in the system as claimed, wherein the markers are disposed on a surface and have a corresponding stored marker stored in a database, the stored marker comprising coordinates for its corresponding marker on the surface.

The above features may be combined as appropriate, as would be apparent to a skilled person, and may be combined with any of the aspects of the examples described herein.

DESCRIPTION OF THE DRAWINGS

FIG. 3 is a simplified flow diagram of an exemplary method for mapping the location and orientation of all available markers.

FIG. 4 is a simplified representation of the optical data observed during optical tracking in accordance with some embodiments of the present invention.

FIG. 5 is a simplified flow diagram of an exemplary method for determining a head pose of a user.

FIG. 7 is a simplified flow diagram of an exemplary method for detecting head position relative to the real-world, whilst a user is on a moving surface.

FIG. 8 is a simplified flow diagram of an exemplary method for tracking head movement over a large volume space.

DESCRIPTION OF THE INVENTION

Figure 1:
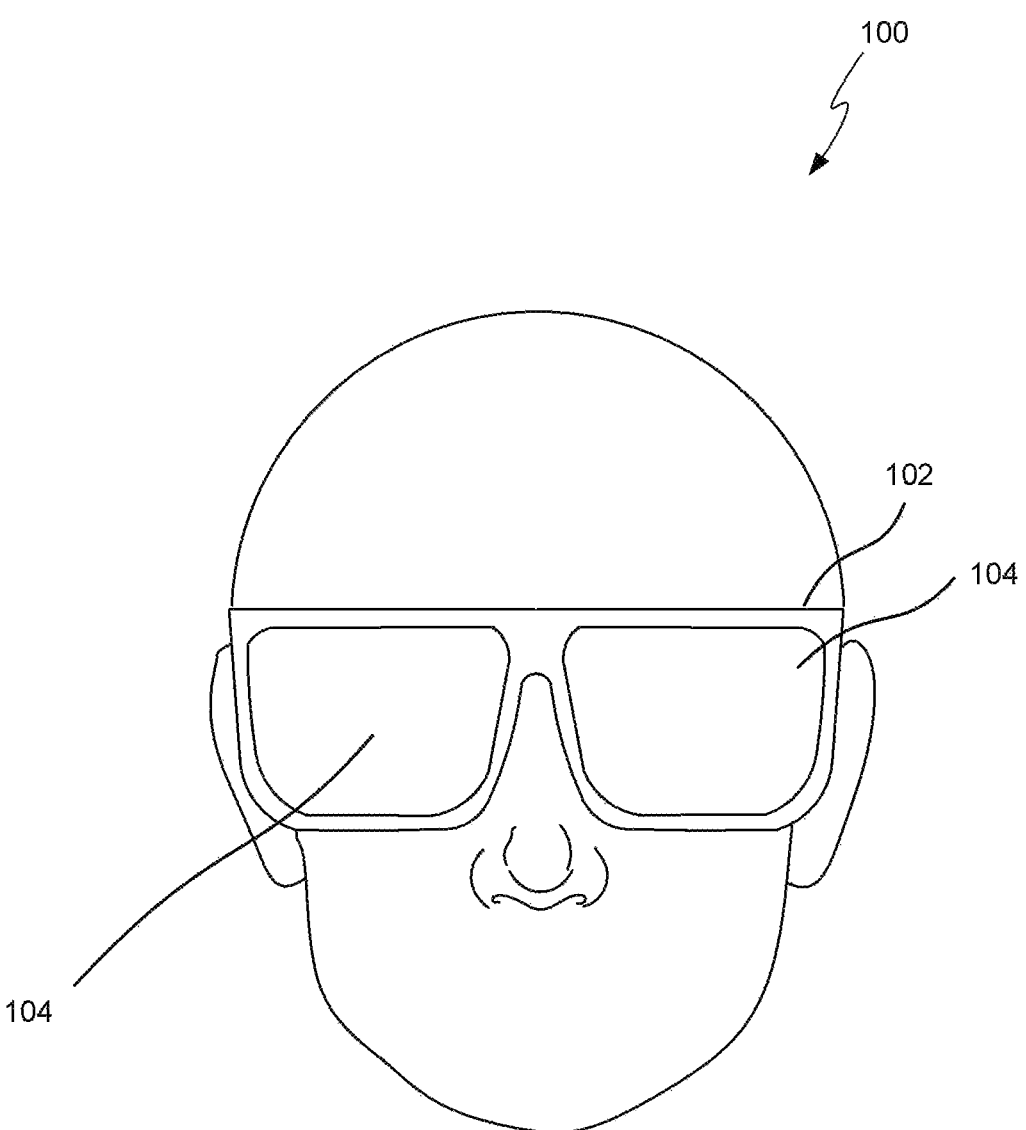
FIG. 1 is a diagram showing a representation of a head-worn display.

In general, the present invention relates to an opto-inertial head-worn display tracking solution to determine a head pose of a user relative to a surface.

The present invention relates to a novel technique to enable tracking of head movement over a large volume space. The accurate tracking of head position of a user wearing a head-worn display (hereinafter referred to as HWD) is beneficial. Accurately tracking the position of the head of the user may enable real-world indicia, as viewed by an observer through a HWD, to be presented at a location within the field-of-view of the HWD that accurately correspond to the location of the indicia in the real-world.

An accurate position of the head relative to the real-world may be determined by an optical hierarchical tracking scheme to determine the spatial location of the user's head relative to a surface by capturing markers on the surface with a head-mounted camera and calculating an absolute position and an absolute orientation of each captured marker. Based on the calculated position and orientation of each marker, the head pose of the user relative to the surface is calculated.

The above-described techniques provide the benefit of an absoluteness and accuracy of optical tracking.

As will be appreciated the present invention relates to an opto-inertial head-worn display tracking solution to accurately determine the head pose of a user relative to a surface.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring back to FIG. 1, illustrating a representation of the HWD 100, the head-worn display 100 can be of any appropriate type including goggles, glasses, a helmet or helmet visor, or in the form of a handheld device which can be brought in front of the eyes. Ideally, the device is portable or adapted to be portable by means of the support. Although not shown in detail, the support may include a support adapted to support the optical elements in front of the eye. The support may include frames; side arms and supports for goggles and glasses; a helmet or visor; a headband; a neck or shoulder worn support; a gaming headset; or any other support that could be worn to hold the optical elements in the desired position. In some embodiments the system could be implemented in a heads-up display (HUD) or any other type of display.

In some embodiments, the optical device may be mounted on a helmet. In alternative embodiments, the optical element 100 includes a frame 102 and two eyepieces 104 and held together by a bridging element. The frame 102 is connected to two arms which support the optical device on the user's head. The eyepieces each include a display element which relay an image to the eye of the user in use. The display element includes, for example, a collimating element, waveguide, a lens system, a prism, or other optical components. The device is shown as binocular in FIG. 1, but it is possible that the device could be monocular with one of the display media being replaced with a blank element. The optical elements may be adapted for use in the non-optical domain. It will be appreciated therefore that optical is not limited herein to mean visible optical frequencies and may include non-visible frequencies.

The two eyepieces 104 are separated by a bridging element. The bridging element may be a band having a combination of a different curvature and a different length. The bridging element may have a specific shape to position or orient the eyepieces 104 in a predetermined location.

Indicia in a location in the FOV of the HWD 100 can be provided to the user. Real-world indicia may comprise any type of symbology or real-world representation. It may be desirable to provide the indicia in a location in the FOV corresponding to its real-world position. Displaying such indicia in an inaccurate position is potentially confusing, frustrating and dangerous for the user. In order to compensate for this, the present invention includes mechanisms for accurately determining the head pose of a user.

In some embodiments, mechanisms for accurately tracking head motion and surface motion are provided. Tracking of the surface motion compensates for the detected head movement sensed due to surface motion. Combining the information describing the current motion of the user's head, the current motion of the surface and the determined head pose of the user relative to the surface allows an accurate latency-free head pose relative to the real-world to be determined, wherein the head pose describes the spatial position of the head relative to the real-world.

Figure 2:
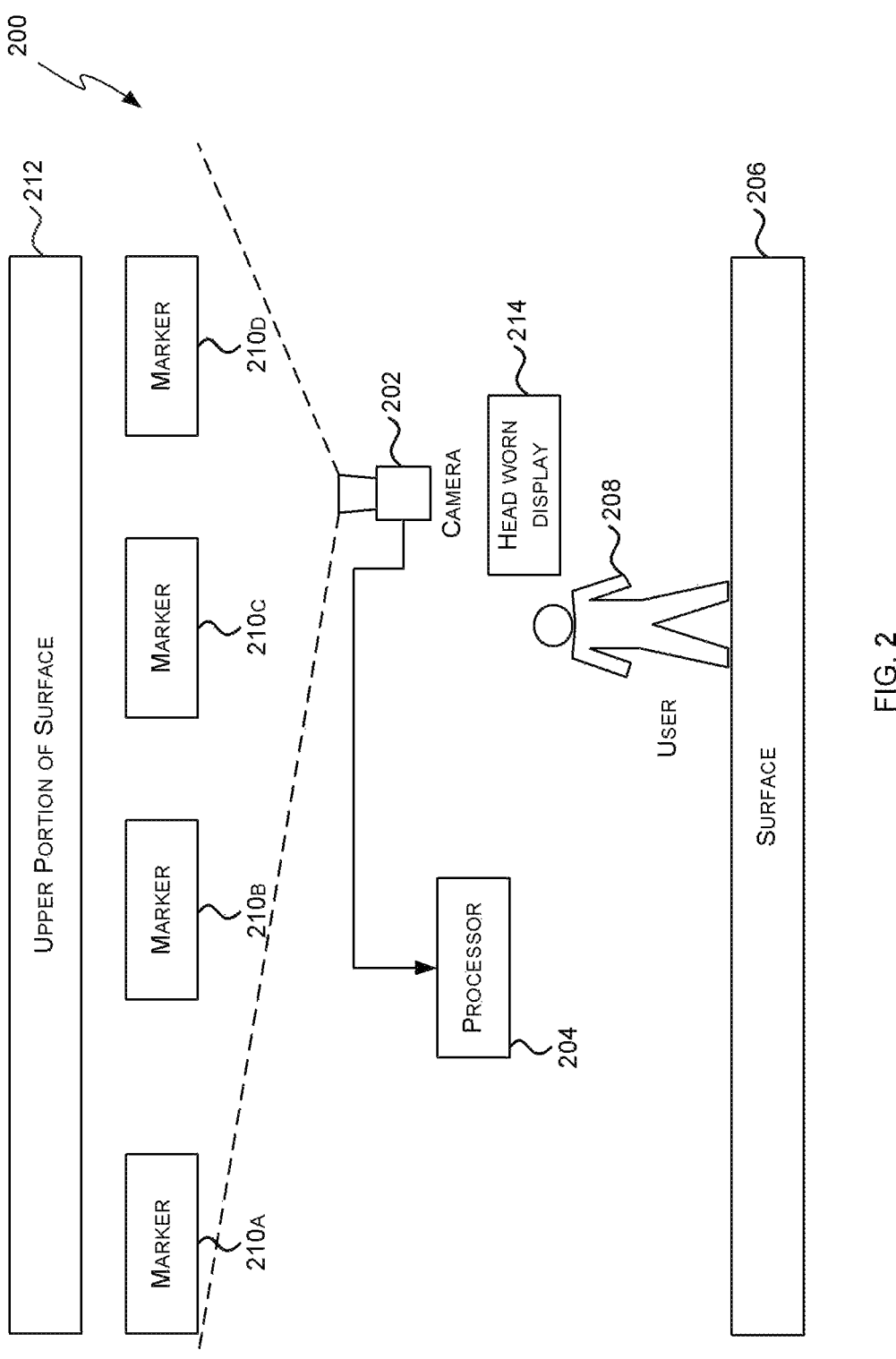
FIG. 2 illustrates an exemplary system in accordance with some embodiments of the present invention.

Referring now to FIG. 2, an exemplary system in accordance with some embodiments of the present invention is illustrated. According to some embodiments of the present invention, the system 200 comprises a head-worn display 214 including a camera 202 and a processor 204.

The surface 206, which may be interchangeably referred to as a platform, may be any given surface on which a user 208 is situated. The surface 206 may include but not be limited to a vehicle or a flight simulation device. The user 208 situated on the surface 206 wears the HWD 214. A camera 202 may be integrated into the body of the HWD 214 or mounted at any suitable location on the HWD 214 such that it can observe images of markers 210a, 210b, 210c, 210d disposed on the surface 206 at one or more predetermined locations. Whilst in FIG. 2 the markers 210a, 210b, 210c, 210d are illustrated as being disposed on an upper portion 212 of the surface, it is appreciated that the markers 210a, 210b, 210c, 210d can be disposed on any suitable location on the surface 206.

The camera 202 may be integral to the HWD 214. The camera 202 may include a plurality of cameras. The cameras may include but not be limited to stereo cameras or depth cameras. Whilst in FIG. 2, it is shown that the camera is upward facing, it is appreciated that the camera 202 can be located or positioned at any suitable location on the HWD 214 such that it is configurable to capture images of the markers. It is appreciated that there may be multiple cameras, provided they can be suitably mounted or integrated into the HWD 214.

FIG. 3 depicts an exemplary method of collecting data for storage in a database. A mapping process is used to map the absolute position and orientation of markers as they appear on the surface from a given perspective, wherein the position and orientation is relative to a reference marker. The reference marker has a known position and orientation on the surface. The plurality of markers as disposed on the surface are hereinafter referred to as surface markers. In some embodiments, the surface markers may be disposed on the upper portion of the surface. Additionally, or alternatively, the surface markers may be disposed on the lower portion of the surface. Additionally, or alternatively, the surface markers may be disposed on one or more of the lateral portions of the surface.

Each surface marker is of a predetermined size and has a predetermined, unique pattern. The surface markers are arranged in a pattern configuration designed to optimise the HWD camera's view of the markers and to avoid obscuration of important physical features on the surface. Each surface marker comprises a plurality of surface points. Each of the plurality of surface points comprises a set of associated coordinates. With reference to FIG. 4, in some embodiments, the surface markers may be rectangular fiducials 400a, 400b, 400c, wherein each of the surface points are the corners of the rectangular fiducials.

Images of all of the surface markers are captured (block 310).

A first list comprising the surface points is collated (block 320). As previously described, each of the surface points comprises an associated set of coordinates.

A second list comprising a set of model points of a set of model markers is collated (block 330). The set of model points define a set of theoretical coordinates.

The first list of surface points and the second list of the model points are compared. Based on the comparison, an orientation and a position of each of the surface points is estimated. Based on the estimated position and orientation of the surface points, the position and orientation of the surface marker associated with a given set of surface points is inferred (block 340).

Based on the inferred position and orientation of the surface markers, the relative positions and orientations between each of the surface markers are estimated (block 350). Optionally, additional images can be captured, and the method as described above can be repeated thereby allowing an improved estimate of the relative positions and orientations between the surface markers to be made.

Based on the estimated relative positions and orientations between each of the surface markers, an absolute position and an absolute orientation of each surface marker relative to a reference marker is calculated (block 360). As described above, a reference marker comprises a marker with a known position and orientation on the surface. In some embodiments, the reference marker may represent the tracker origin.

Each surface marker corresponds to a marker stored in a Marker Definition Database (MDD) (not shown). Markers stored in the MDD are hereinafter referred to as stored markers. For each surface marker, the corresponding stored marker is identified in the MDD (block 370). Each stored marker is of a predetermined size and has a predetermined, unique pattern, the size and pattern corresponding to the size and pattern of one of the surface markers. Each stored marker has a plurality of stored points corresponding to the plurality of surface points of its associated surface marker. Each stored marker is identified according to its resemblance to a surface marker. In some embodiments, the stored marker is identified by cross-referencing the pattern of each surface marker with the stored markers. As each surface marker has a predetermined size and a predetermined unique pattern, it is assumed that the stored marker that most closely resembles the surface marker is the correctly corresponding stored marker. Additionally, or alternatively, the stored marker may be identified by cross-referencing the plurality of surface points with the plurality of stored points.

For each marker on the surface, its corresponding stored marker is updated to include at least the absolute position and absolute orientation its surface marker relative the reference marker, when the surface marker has the same orientation as that of the stored marker (block 380). In some embodiments, the stored marker may be updated to additionally include the inferred position and orientation of the surface marker and/or the estimated relative positions and orientations between each of the surface markers.

FIG. 5 illustrates a simplified flow diagram of an exemplary method 500 for determining head pose. As described above in relation to FIG. 3, the plurality of markers as disposed on the surface are referred to as surface markers. In some embodiments, the surface markers may be disposed on the upper portion of the surface. Additionally, or alternatively, the surface markers may be disposed on the lower portion of the surface. Additionally, or alternatively, the surface markers may be disposed on one or more of the lateral portions of the surface.

Each surface marker is of a predetermined size and has a predetermined, unique pattern. The surface markers are arranged in a pattern configuration designed to optimise the HWD camera's view of the markers and to avoid obscuration of important physical features on the surface. Each surface marker comprises a plurality of surface points. Each of the plurality of surface points comprises a set of associated coordinates. With reference to FIG. 4, in some embodiments, the surface markers may be rectangular fiducials 400a, 400b, 400c, wherein each of the surface points are the corners of the rectangular fiducials.

One or more images, captured by a head-mounted camera worn by a user, are received (block 510). The one or more images include a representation of one or more surface markers within the FOV of the camera. For the purposes of this description the surface markers and associated surface points as captured by the camera are referred to as captured markers and captured points respectively.

The MDD is accessed. The MDD comprises a plurality of stored markers. Each stored marker has a predetermined orientation and corresponds to one of the plurality of surface markers. Each stored marker is of a predetermined size and has a predetermined, unique pattern, the size and the pattern corresponding to the size and pattern of one of the surface markers. Each stored marker has a plurality of stored points corresponding to the surface points its surface marker. Each stored marker includes at least the absolute position and absolute orientation of its corresponding surface marker as output from the mapping method of FIG. 3. Each stored marker may additionally include the inferred position and orientation of the surface marker and/or the estimated relative positions and orientations between each of the surface markers.

For each captured marker, the corresponding stored marker is identified in the MDD (block 520). In some embodiments, each stored marker is identified according to its resemblance to a captured marker by cross-referencing the pattern of each captured marker with the stored markers. As each captured marker has a predetermined size and a predetermined unique pattern, it is assumed that the stored marker that most closely resembles the captured marker is the correctly corresponding stored marker. Additionally, or alternatively, the stored marker may be identified by cross-referencing the plurality of surface points with the plurality of stored points.

For each captured marker, an orientation of the captured marker relative to its corresponding stored marker is calculated (block 530). As described above, each stored marker has a predetermined orientation. Whilst each surface marker corresponds to one of the stored markers, the surface markers as captured in the images may have a different orientation to that of its corresponding stored marker. In other words, the captured markers may be orientated differently to their corresponding stored markers. In some embodiments, each captured marker is compared to its corresponding stored marker in order to determine how the captured marker is orientated with respect to its corresponding stored marker.

For each captured marker, the stored data including the absolute position and orientation of the captured marker relative to the reference marker having a known position and orientation is obtained from the MDD (block 540).

A set of coordinates defining the absolute position and orientation of the captured marker relative to the reference marker is determined (block 550). As described above, the stored data for each stored marker includes the absolute position and orientation of its corresponding captured marker relative to the reference marker. Using the determined orientation of the captured marker relative to its corresponding stored marker, the absolute position and orientation of the captured marker relative to the reference marker can then be determined.

The head pose of the user relative to the surface is calculated (block 560). As the captured markers are within the FOV of the head-mounted camera, the position and orientation of the camera relative to the captured markers can be inferred. The absolute position and orientation of the captured markers relative to the reference marker having a known position and orientation on the surface has been calculated, such that the position and orientation of the camera relative to the reference marker can be determined. In this way, based on the absolute position and orientation of the captured marker relative to the reference marker, the absolute position and orientation of the captured markers on the surface can subsequently be determined. The methods as described above may enable the orientation and position of the HWD relative to the surface to be accurately calculated in six degrees of freedom.

As described above, in some embodiments, the markers on the surface are rectangular fiducials as depicted in FIG. 4. The multi-marker or multi-fiducial style of tracking as described herein provides a tracking capability with improved tracking accuracy over a single (typically smaller) marker tracker. The ability to combine multiple points from multiple markers over the field of view of the camera maximizes the spatial spread of points used to estimate the tracking pose and therefore leads to a more stable and less noisy tracking solution.

Figure 6:
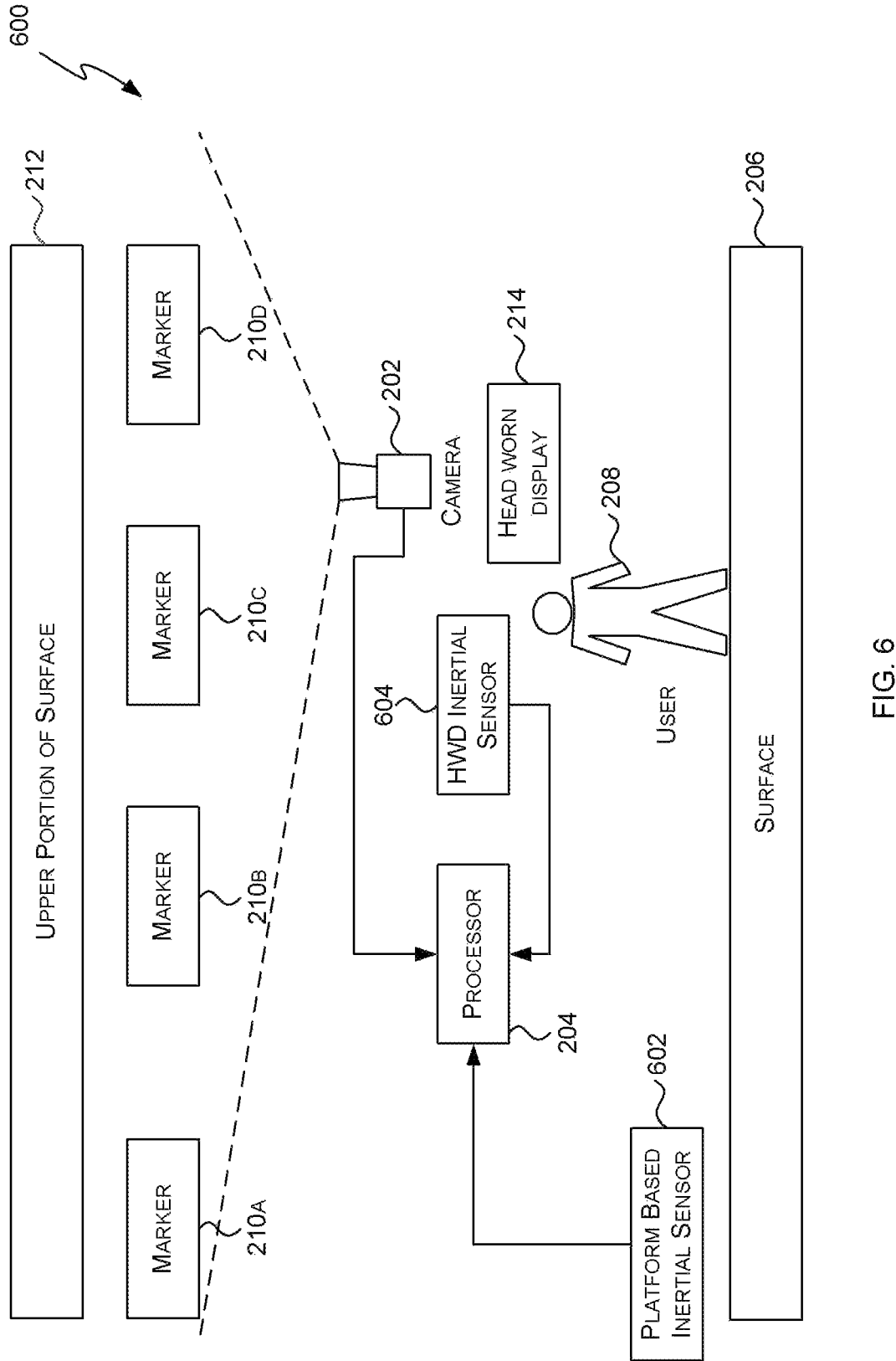
FIG. 6 is a simplified block diagram of an exemplary system in accordance with some embodiments of the present invention.

FIG. 6 is a simplified block diagram of an exemplary system in accordance with some embodiments of the present invention. In these embodiments, the surface may be in motion. The output of the optical tracking scheme may be combined with inertial data to further improve the accuracy of the determined head position. Combining positional data indicating the orientation of a surface moving relative to the real world and optical data relating to the spatial location of the user's head relative to the surface. A first set of inertial data may relate to the motion of the surface. A second set of inertial data may relate to the motion of the user's head. Based on the sets of inertial data, the motion of the user's head that is attributable to the motion of the surface can be calculated and offset.

Additionally, the latency of the optical tracking solution may be reduced by forward-predicting head movement. This provides an estimate of the ultimate head-position in the real-world based on an output of an inertial sensor on the HWD, thereby reducing the time required to determine the actual head position.

These above-described techniques provide the benefits of the absoluteness and accuracy of the optical tracking. Coupled with the speed and reduced latency achieved by the inertial tracking. The system can compensate for the latency of head motion and the motion of the moving surface, thereby providing a system with reduced uncertainty.

In addition to that as described with respect to FIG. 2, FIG. 6 includes a surface-based inertial sensor 602. The surface-based inertial sensor 602 may comprise an Inertial Measurement Unit. The Inertial Measurement Unit may comprise any suitable combination of sensors thereof. The surface-based inertial sensors 602 may include but not be limited to accelerometers, gyroscopes and magnetometers. The surface-based inertial sensors 602 may detect the force (e.g. gravitational) experienced by the surface 206 during motion, the angular rate of the surface 206, and the velocity, acceleration, deceleration and/or orientation of the surface 206.

The HWD 214 may also include at least one HWD-inertial sensor 604 or any combination of suitable sensors thereof. Such sensors may include but not be limited to accelerometers and gyroscopes. The HWD-inertial sensor 604 may determine a change in the spatial position of the HWD 214. The motion of the head of the user 208 may be determined based on the detected change in the spatial position of the HWD. Additionally, the HWD-inertial sensors 604 may forward-predict the movement of the user's head to determine a predicted position of the user's head relative to the real-world. The forward-prediction may be used to reduce the observed latency of the overall tracking solution.

The at least one HWD-inertial sensor 604 may be integral to the HWD 214. Alternatively, the sensor(s) may have detachable elements that can be mounted to the HWD 214 at any suitable location such that the HWD-inertial sensors 604 are configurable to detect the current head motion of the user 208 wearing the HWD 214. The HWD-inertial sensors 604 may be configurable to detect force, angular rate, velocity, linear acceleration and deceleration and/or any change in orientation experienced by the head of the user 208.

An alternative embodiment describes using the outputs of the HWD-inertial sensor 604 and the surface-based inertial sensor 602 to determine head pose. In this alternative embodiment, the optical tracking data from camera 202 may be unavailable or invalid, if, for example, the camera 202 experiences an occlusion, or if the images of the fiducial markers are distorted for any reason such as by shadowing. In this alternative embodiment, the surface 206 is mounted with an additional sensor that provides the overall tracking mechanism with a periodic attitude.

The HWD-inertial sensors 604 may determine the current motion of the user's head as described in the embodiments above.

The surface-based inertial sensor 602 may detect the motion of the surface 206 relative to the real world as described in the embodiments above.

The data relating to the motion of the surface 206 and the current motion of the user's head may be combined to enable the system to coast without the need for optical tracking data obtained from camera 202. Once the optical tracking resumes, the optical tracking data, the surface motion data and the head motion data can be combined to calculate an accurate head pose relative to the real-world as described above.

FIG. 7 is a simplified flow diagram of an exemplary method 700 for detecting head position relative to the real-world, whilst a user is on a moving surface.

A first set of coordinates comprising an orientation of a surface moving relative to the real-world may be determined based on a first output from surface-based inertial sensors (block 710). A second set of coordinates comprising the spatial position of the head-worn display relative to the moving surface may be determined (block 720). A predicted movement of the user's head based on inertial measurements may be determined to generate a coordinate offset based on the predicted movement (block 730). Based on the first set of coordinates, the second set of coordinates and the coordinate offset, a third set of coordinates indicating the spatial position of the head-worn display relative to a real-world reference may be determined (block 740).

The method for the detection of head position relative to the real-world may further be improved by the inclusion of additional inertial data. A change in the third set of a coordinates may be detected to determine a change in the position of the surface relative to the real-world based on a second output from surface-based inertial sensors. A change in a fourth set of coordinates may be detected to determine a change in the spatial position of the user's head based on the output of a HWD-based inertial sensor. The relative change in the user's head motion that is attributable to the motion of the surface is calculated as a relative change in the fourth set of coordinates. The relative change in the fourth set of coordinates is offset.

The latency of the tracking solution may be reduced by forward predicting the orientation of the tracker based on the output of a HWD-based inertial sensor.

Referring now to FIG. 8 which illustrates a simplified flow diagram of an exemplary method 800 for improving tracking of head movement over a large volume space using forward-prediction. A first set of coordinates comprising an orientation of a surface moving relative to the real-world may be determined based on a first output from surface-based inertial sensors (block 810).

A second set of coordinates comprising the spatial position of the head-worn display relative to the surface may be determined. According to some embodiments of the present invention, determining the second set of coordinates may further comprise obtaining optical tracking data using a camera, wherein the optical tracking data comprises images of markers with a known spatial location disposed on the surface moving relative to the real-world (block 820).

A predicted movement of the user's head based on inertial measurements may be determined to generate a coordinate offset based on the predicted movement (block 830).

Based on the first set of coordinates, the second set of coordinates and the coordinate offset, a third set of coordinates indicating the spatial position of the head-worn display relative to a real-world reference may be determined (block 840).

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A computer-implemented method of determining a head pose of a user, the method comprising:

receiving an image captured by a head-mounted camera worn by the user, the image comprising a captured marker, wherein the captured marker is one of a plurality of markers on a surface that are in the FOV of the head-mounted camera;

identifying, from a database, one of a plurality of stored markers, each stored marker having a predetermined orientation and a corresponding marker on the surface, wherein each stored marker comprises coordinates for its corresponding marker on the surface;

calculating an orientation of the captured marker relative to its corresponding stored marker;

obtaining from the database, the corresponding stored marker;

determining, based on the corresponding stored marker and the calculated orientation, an absolute pose of the marker;

calculating, based on the absolute pose of the captured marker, the head pose of the user relative to the surface, wherein each marker on the surface comprises a plurality of points having an associated set of coordinates; and collecting data for storage in the database, the collecting including capturing images of all markers on the surface using the head-mounted camera, comparing the plurality of points in each of the captured markers with a plurality of points in a set of model markers, the set of model points having an associated set of theoretical coordinates, based on the comparison, inferring the position and orientation of each of the markers on the surface, based on the inferred position and orientation of each of the markers on the surface, estimating the relative position and orientation of each of the markers on the surface, based on the estimated relative position and orientation of each of the markers on the surface, calculating an absolute position and an absolute orientation of the each of the markers on the surface relative to a reference marker, the reference marker having a known position and orientation on the surface, identifying, from the database, for each maker on the surface, the corresponding stored marker, and updating, for each marker on the surface, the corresponding stored marker to include the absolute position and the absolute orientation.

2. The method of claim 1, wherein each stored marker comprises a plurality of stored points, each stored point corresponding to one of the points of its corresponding marker on the surface.

3. The method of claim 1, wherein updating the corresponding stored marker for each marker on the surface further comprises updating the corresponding stored marker to include at least one of the inferred position and orientation of its corresponding marker on the surface and the relative position and orientation of its corresponding marker on the surface relative to the other markers on the surface.

4. The method of claim 2, wherein identifying one of the plurality of stored markers further comprises comparing the plurality of points in the captured marker with at least some of the plurality of stored points in the stored markers in the database.

5. The method of claim 1, wherein identifying, from the database, one of a plurality of stored markers further comprises cross-referencing, for each captured marker, the captured marker with the stored markers in the database, wherein each captured marker has a predetermined pattern and its corresponding stored marker has the same pattern.

6. The method of claim 1, wherein the markers on the surface are rectangular fiducials.

7. The method of claim 6, wherein the plurality of points within the markers on the surface form the corners of the rectangular fiducials.

8. The method of claim 1, wherein calculating, based on the absolute pose of the captured marker, further comprises determining the head pose of the user relative to the surface in six degrees of freedom.

9. The method of claim 1, wherein the determining the absolute pose of the captured marker further comprises: determining an absolute position and an absolute orientation of the captured marker relative to a reference marker having a known position and orientation on the surface.

10. The method of claim 9, wherein the known position and orientation of the reference marker is representative of the origin of the head-mounted camera.

11. The method of claim 1, wherein the head-mounted camera is mounted on or is integral to a head-worn display.

12. The method of claim 1, wherein the head-mounted camera for capturing the image comprises a stereo camera and/or a depth camera.

13. The method of claim 1, wherein surface is included in a vehicle or flight simulation device.

14. A system comprising:
   a head-worn display comprising at least one camera adapted to capture one or more images of a scene in which a plurality of markers on a surface are located; and
   a processor configured to execute instructions to
      process the one or more images to identify a captured marker,
      identify, from a database, one of a plurality of stored markers, each stored marker having a predetermined orientation and a corresponding marker on the surface, wherein each stored marker comprises coordinates for its corresponding marker on the surface,
      calculate an orientation of the captured marker relative to its corresponding stored marker,
      obtain, from the database, the corresponding stored marker,
      determine, based on the corresponding stored marker and the calculated orientation, an absolute pose of the marker,
      calculate, based on the absolute pose of the captured marker, a head pose of a user relative to the surface, when the user is wearing the head-worn display;

wherein the head-worn display is further configured to capture an image of all the markers on the surface, and wherein the processor is further configured to
   compare a plurality of points in each of the captured markers with a plurality of model points in a set of model markers, wherein the each of plurality of points have an associated set of coordinates and wherein the each of the plurality of model points have an associated set of theoretical coordinates;
   based on the comparison, infer the position and orientation of each of the markers on the surface;
   based on the inferred position and orientation of each of the markers on the surface, estimate the relative position and orientation of each of the markers on the surface relative to the other markers on the surface;
   based on the estimated relative position and orientation of each of the markers on the surface, calculate an absolute position and an absolute orientation of the each of the markers on the surface relative to a reference marker, the reference marker having a known position and orientation on the surface;
   identify, from the database, for each marker on the surface, the corresponding stored marker; and
   update, for each marker on the surface, the corresponding stored marker to include the absolute position and the absolute orientation.

15. The system of claim 14, wherein the processor is further configured to update, for each marker on the surface, the corresponding stored marker to include at least one of the inferred position and orientation of its corresponding marker on the surface and the relative position and orientation of its corresponding marker on the surface relative to the other markers on the surface.

16. The system of claim 14, wherein the processor is further configured to compare the plurality of points in the captured marker with a plurality of stored points in the corresponding stored marker, each stored point corresponding to one of the points in the corresponding captured marker.

17. The system of claim 14, wherein the processor is further configured to cross-reference the captured marker with the stored markers in the database, wherein the captured marker has a predetermined pattern and its corresponding stored marker has the same pattern.

18. The system of claim 14, wherein the processor is further configured to:
   determine the head pose of the user relative to the surface in six degrees of freedom; and/or
   determine, for the captured marker, an absolute position and an absolute orientation relative to a reference marker having a known position and orientation on the surface.

19. A system comprising:
   a head-worn display comprising at least one camera adapted to capture one or more images of a scene in which a plurality of markers on a surface are located;
   a first inertial sensor configured to provide first inertial data related to motion of the surface;
   a second inertial sensor configured to provide second inertial data related to motion of a user's head, when the user is wearing the head-worn display; and
   a processor configured to execute instructions to
      process the one or more images to identify a captured marker,
      identify, from a database, one of a plurality of stored markers, each stored marker having a predetermined orientation and a corresponding marker on the surface, wherein each stored marker comprises coordinates for its corresponding marker on the surface, calculate an orientation of the captured marker relative to its corresponding stored marker, obtain, from the database, the corresponding stored marker, determine, based on the corresponding stored marker and the calculated orientation, an absolute pose of the marker, and calculate, based on the absolute pose of the captured marker and the first and second inertial data, a head pose of a user relative to the surface, when the user is wearing the head-worn display, wherein the first and second inertial data are used to compensate for detected head movement sensed due to motion of surface, wherein the head-worn display is further configured to capture an image of all the markers on the surface, and wherein the processor is further configured to execute instructions to compare a plurality of points in each of the captured markers with a plurality of model points in a set of model markers, wherein the each of plurality of points have an associated set of coordinates and wherein the each of the plurality of model points have an associated set of theoretical coordinates;

based on the comparison, infer the position and orientation of each of the markers on the surface;

based on the inferred position and orientation of each of the markers on the surface, estimate the relative position and orientation of each of the markers on the surface relative to the other markers on the surface;

based on the estimated relative position and orientation of each of the markers on the surface, calculate an absolute position and an absolute orientation of the each of the markers on the surface relative to a reference marker, the reference marker having a known position and orientation on the surface;

identify, from the database, for each marker on the surface, the corresponding stored marker; and update, for each marker on the surface, the corresponding stored marker to include the absolute position and the absolute orientation.

\* \* \* \* \*